INVENTORS
L. E. ROBINSON
D. E. PERRY
BY
Young + Quigg
ATTORNEYS

United States Patent Office 3,424,358
Patented Jan. 28, 1969

3,424,358
METHOD FOR PRODUCING FIBRILLATED FILM
Leroy E. Robinson and Dan E. Perry, Bartlesville, Okla., assignors to Phillips Petroleum Company, a corporation of Delaware
Filed Mar. 25, 1965, Ser. No. 442,588
U.S. Cl. 225—3        6 Claims
Int. Cl. B26f 3/02; B65h 35/10

ABSTRACT OF THE DISCLOSURE

Oriented film is fibrillated between two belts of elastic material by distending the belts in a direction transverse to the direction of orientation of the film by passing pressure means across and in contact with at least one elastic belt so that the component of the velocity of the pressure means that is parallel to the direction of movement of the film is substantially equal to the velocity of movement of the film.

---

This invention relates to a method and apparatus for producing nonwoven fabrics from continuous sheet material.

It is known that many synthetic organic linear polymers possess a marked fissility when they have been uniaxially oriented to a high degree and that films of these highly oriented films can be split into individual fibers or into a network of coherent fibers by suitable mechanical means such as brushing, rubbing and the like.

Heretofore, in order to make a continuous, high-speed process of splitting an oriented film into fibers or a network of coherent fibers, i.e., fibrillating, a roller or other mechanical device for deforming the elastic belts, and therefore fibrillating the film therebetween, was disposed, relative to the belts, so that the device rolled in a direction parallel to the direction of movement of the belts. For example, if a single roller was utilized to deform the belts and therefore fibrillate the film the long, major axis of the roller was disposed so that it was perpendicular to the longitudinal axis and direction of movement of the belts and the roller thus rotated in the same direction as the belts moved.

However, generally the film between the belts is oriented so that the orientation direction thereof is substantially parallel to longitudinal axis and, therefore, the direction of movement of the belts. Since the degree of fibrillation of the film depends upon the degree of distension of the belts in a direction perpendicular to the orientation direction of the film it is preferred and highly desirable to effect maximum distension of the belts in a direction perpendicular to the longitudinal axis thereof and, therefore, perpendicular to the direction of orientation of the film between the belts. Thus, a maximum degree of fibrillation was not achieved in prior methods since those methods effected maximum distension of the belts, and film therebetween, in a direction parallel and not perpendicular to the direction of movement of the belts.

It has now been found that a continuous, high-speed method of fibrillating a film between two belts of elastic material by distending the belts to the maximum possible extent in a direction perpendicular to the longitudinal axis thereof is effected when the moving belts with the film therebetween have at least one pressure means such as a roller passed across the path of movement of and in contact with the belts in a direction and with a velocity relative to the direction and velocity of movement of the belts such that the component of the velocity of the pressure means that is parallel to the direction of movement of the belts is substantially equal to the velocity of the belts. By this procedure, when the pressure means contacts the belts it is moving in the direction of movement of the belts at a velocity equal to the velocity of the belts and thus the net effect is that the pressure means travels with the belts but at the same time across the belts in a direction of travel perpendicular to both the direction of travel of the belts and the orientation of the film.

It was also found that the above method could be carried out by an apparatus utilizing a first pair of endless belts which are elastic and are adapted to meet on the exterior surfaces thereof and move along a fixed line of travel and a pressure means which is adapted to cross the fixed line of travel of the endless belts and contact and distend same. The pressure means is controlled by a mechanism which coordinates the direction and velocity of movement thereof relative to the endless belts as above described. At least one of the endless, elastic belts can be an endless chain of plates, each plate covered by an elastic material so that, in effect, the film is pressed between two elastic surfaces.

Accordingly, it is an object of this invention to provide a new and improved method of fibrillating oriented film. It is another object of this invention to provide a new and improved apparatus for fibrillating oriented film.

Other aspects, objects and the several advantages of the invention will be readily apparent to those skilled in the art from the description, the drawing and the appended claims.

Figure 1:
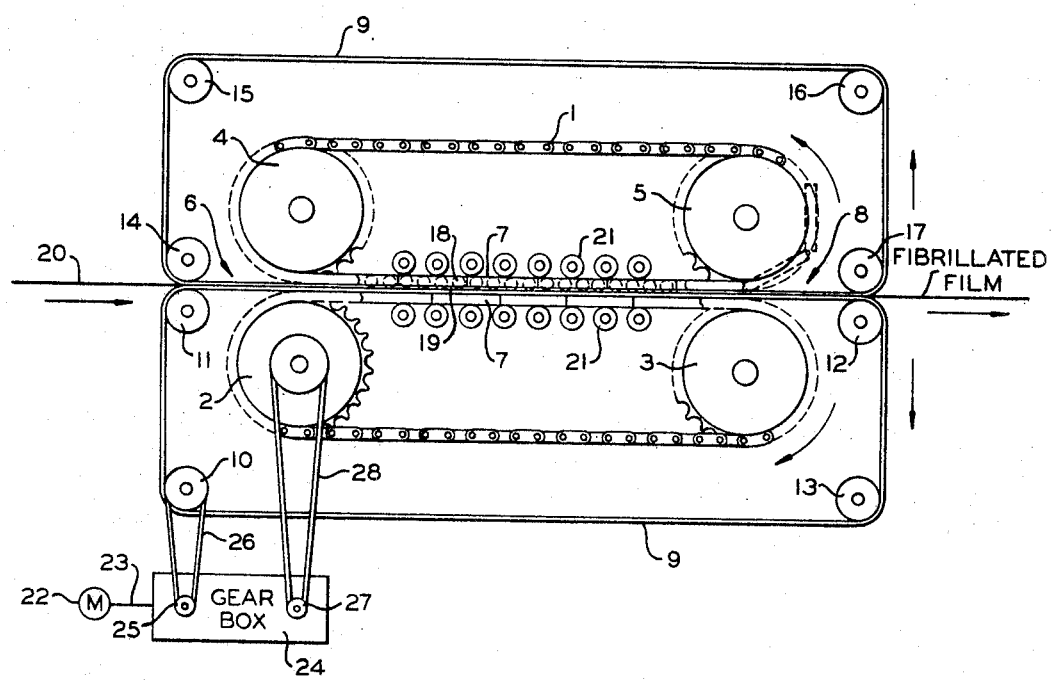
FIGURE 1 is a side elevation of apparatus embodying the invention.

In FIGURE 1 there is shown a pair of endless chains of plates 1, 1 carried by sprockets 2, 3, 4 and 5 which sprockets are in turn carried by a suitable frame not shown. Chains 1, 1 are a series of rotatingly connected, rigid plates which substantially abut one another when traveling in a straight line between the supporting sprockets. Chains 1, 1 are adapted to approach each other on their exterior surfaces in the general area 6 thereby moving individual and opposed plates 7, 7 on each chain into a close but spaced-apart relationship. Chains 1, 1 and plates 7, 7 move in this close but spaced-apart relationship along a fixed line of travel and at a first primary velocity before separating in the general area 8 and returning to the general area 6.

Figure 2:
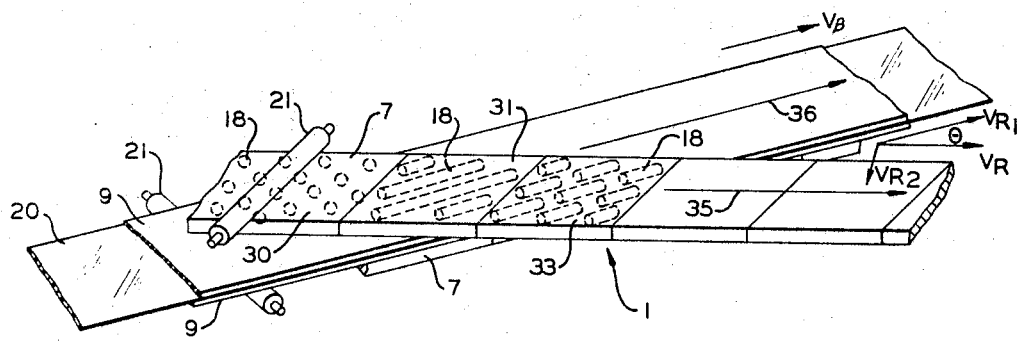
FIGURE 2 is a perspective view of the relation of the elastic belts carrying the film and the roller carrying plates crossing those belts.

A pair of endless belts 9, 9 which are made of an elastic material such as rubber rotate about sprockets 10, 11, 12, 13, 14, 15, 16 and 17. This second pair of belts is adapted to meet on their exterior surfaces in the general area 6 and travel along a fixed line of travel at a second primary velocity and to intersect the line of travel of the first pair of belts at an angle, hereinafter referred to as theta, of less than 90° and to pass between the spaced-apart plates 7, 7 of chains 1, 1. A pressure means 18, further described with reference to FIGURE 2, is carried by plates 7, 7 on at least one of chains 1, 1. Pressure means 18 is adapted to extend into the space between spaced-apart plates 7, 7 as indicated by 19 and is further adapted to rotate in a direction perpendicular to the direction of movement of belts 9, 9. That part of pressure means 18 that extends into space 19 contacts belt 9, 9 and forces same against a plate 7 on the opposite side of belts 9, 9 thereby applying pressure to belts 9, 9 while traveling with same in their direction of travel and at the same time perpendicularly across belts 9, 9.

It should be noted that the lower chain of plates may or may not have pressure means 18 and there can be substituted a stationary backup plate against which belts 9, 9 are pressed by pressure means 18 in the upper chain of plates.

Thus, a continuous, longitudinally-oriented film 20 which is passed between belts 9, 9 is fibrillated by pressure means 18 perpendicularly crossing belts 9, 9 thereby distending the belts to the maximum extent in the direction perpendicular to the direction of travel of belts 9, 9 and the direction of orientation of film 20.

To ensure that maximum pressure is applied by pressure means 18 to belts 9, 9 rotating pressure means 21, 21 on the interior surfaces of chains 1, 1 are positioned on either side of belts 1, 1 in the area where belts 9, 9 are passing between plates 7, 7. Although the rotating pressure means 21, 21 can be any type of means known, it is preferably a series of stationary rollers disposed throughout the whole length of the zone of coaction, i.e., intersection, between chains 1, 1 and belts 9, 9.

Chains 1, 1 and belts 9, 9 are driven by a single motor 22 which is connected by 23 to gear box 24 which gear box is arranged internally in a known manner so that gear 10 is driven by pulley 25 and pulley belt 26 at one velocity and sprocket 2 is dirven by gear 27 and belt 28 at another velocity. An arrangement similar to that shown for gears 25 and 27 and pulley belts 26 and 28 is arranged on the opposite side of gear box 24, not shown, to rotate pulley 14 and sprocket 4 at the same velocities, respectively, of pulley 10 and sprocket 2. The relative velocity of belts 1, 1 and 9, 9 are adjusted through gear box 24 so that the component of the primary velocity of chains 1, 1 which is parallel to the fixed line of travel of belts 9, 9 is equal to the primary velocity of belts 9, 9, the primary velocities of chains 1, 1 and belts 9, 9 being that velocity parallel to the longitudinal axis of the belts and is directly related to the speed at which pulleys 10 and 14 and sprockets 2 and 4 are rotated by pulleys on gear box 24.

In FIGURE 2 there is shown continuous film 20 between belts 9, 9 and plates 7, 7. Two pressure-rotating means in the form of rollers 21, 21 press against plates 7, 7 as they pass across belts 9, 9.

Single plate 30 has therein a pressure means 18 in a form of a spherical ball which freely rotates in plate 30 and therefore is adapted to rotate in a direction perpendicular to the direction of movement of belts 9, 9. Separate plate 31 shows a presure means 18 which comprises elongate rollers so oriented with respect to the direction of travel of the plate that they are free to rotate in a direction perpendicular to the line of travel of belts 9, 9. Separate plate 33 shows a pressure means 18 which comprises smaller rollers. In order to insure that maximum coverage of belts 9, 9 with pressure means 18 is effected varying types of pressure means 18 can be employed as the same chain of plates as showin in FIGURE 2; however, a single type of rolling means can be employed throughout in a chain of plates as shown in FIGURE 1. Other types of rotating means are contemplated by this invention and will be obvious to those skilled in the art.

The direction of travel of chains 1, 1 is indicated by arrow 35 and the direction of travel of belts 9, 9 is indicated by arrow 36, the intersection of which two arrows subtends the angle theta. Arrow 35 is parallel to the longitudinal axis of chains 1, 1 and arrow 36 is parallel to both the longitudinal axis of belts 9, 9 and the orientation direction of film 20.

Thus, for a given primary velocity of belts 9, 9 indicated by $V_B$ there is for a given angle theta a corresponding primary velocity for chains 1, 1 indicated as $V_R$ which will yield a component designated as $V_{R1}$ which is parallel to the primary velocity $V_B$ and which is equal in magnitude to $V_B$. Similarly, primary velocity $V_R$ for chains 1, 1, will have a component $V_{R2}$ which is perpendicular to the line of movement 36 of belts 9, 9 and therefore indicates the velocity at which rolling means 18 passes perpendicularly across belts 9, 9 thereby distending those belts to a maximum amount in this perpendicular direction. It can thus be seen that the only net relative movement of rotating means 18 while in contact with belts 9, 9 is perpendicular to the longitudinal axis of belts 9, 9.

It should be noted that more than one set of chains 1, 1 and/or belts 9, 9 can be employed. Also, more than one set of chains 1, 1 can be employed on a single set of belts 9, 9 and vice versa. Further, when more than one set of chains 1, 1 is employed with a single set of belts 9, 9 varying angle thetas can be employed and the various chains 1, 1 can approach the signal belt, 9 from either side thereof.

This invention applies to any orientable film known in the art such as films of thermoplastic resins, for example, polyalkylenes such as polyethylene, polyamides such as nylon, polycarbonates and polyvinyl alcohol. The only requirement of the films is that they be oriented at least uniaxially which orientation can be achieved by any known method such as by stretching the film in a cold or heated state. A preferred method of orienting a film is disclosed in U.S. Patent 2,943,356 issued to Ole-Bendt Rasmussen on July 5, 1960. The films can have a thickness of from ½ to 10, preferably from 1 to 5, mils.

The product of this invention is a fibrillated film which has great porosity and flexibility in combination with good strength properties and is well suited for use as a nonwoven textile material, filter material and the like.

The velocities of movement of either set of belts is dictated only by the specific apparatus used and vary widely since the apparatus and method are extremely flexible in that the relative velocities of both sets of belts and the angle theta between same can all three be varied until the desired combination of velocities and angle above described is achieved. All that is required of the primary velocities and their angle theta is that the ratio of the velocity of belts 9, 9 to the velocity of chains 1, 1 be equal to the cosine of the angle between them, i.e. the cosine of theta.

Figures 3, 4:
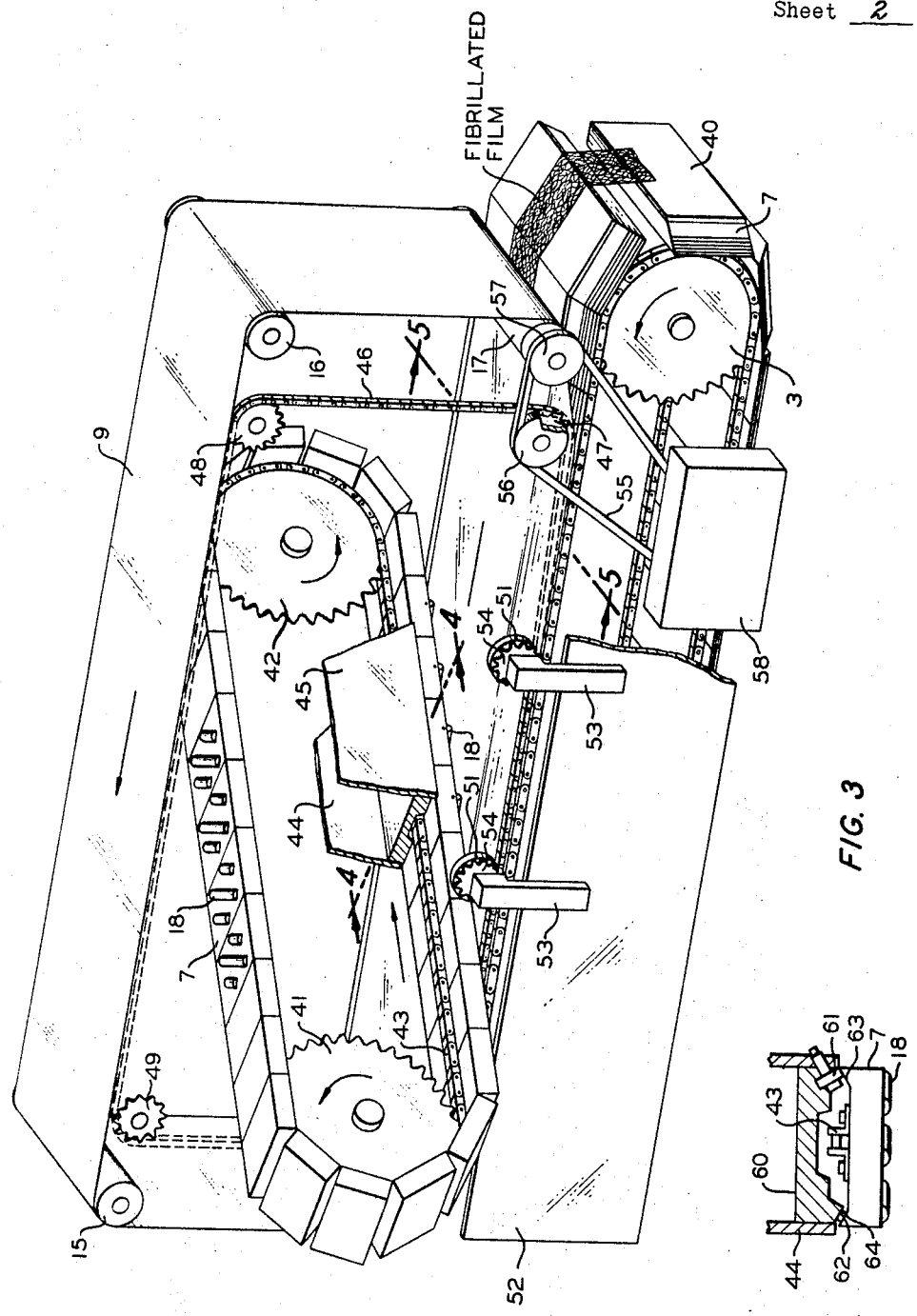
FIGURE 3 is a perspective view of another apparatus embodying the invention.
FIGURE 4 is a cross section of the pressuring apparatus used in FIGURE 3.

FIGURE 3 shows an embodiment of the invention wherein the lower elastic, endless belt 9 of FIGURE 1 has been replaced by surfacing each plate 7 of the lower endless chain of plates of FIGURE 1 with a section of elastic material 40. The section of elastic or resilient material which at least partially, preferably substantially completely, covers each lower plate 7 is preferably composed of the same type of elastic material as upper endless belt 9.

In FIGURE 3 the upper endless chain of plates utilizes single sprockets 41 and 42 and a single chain 43 in lieu of two chains 1, two sprockets 4 and two sprockets 5 as shown in FIGURE 1. Side plates 44 and 45 carry a pressure means that straddles chain 43 and not only applies a vertical pressure to plates 7 but also laterally stabilizes those plates. This pressure means is more specifically shown in FIGURE 4.

Figure 5:
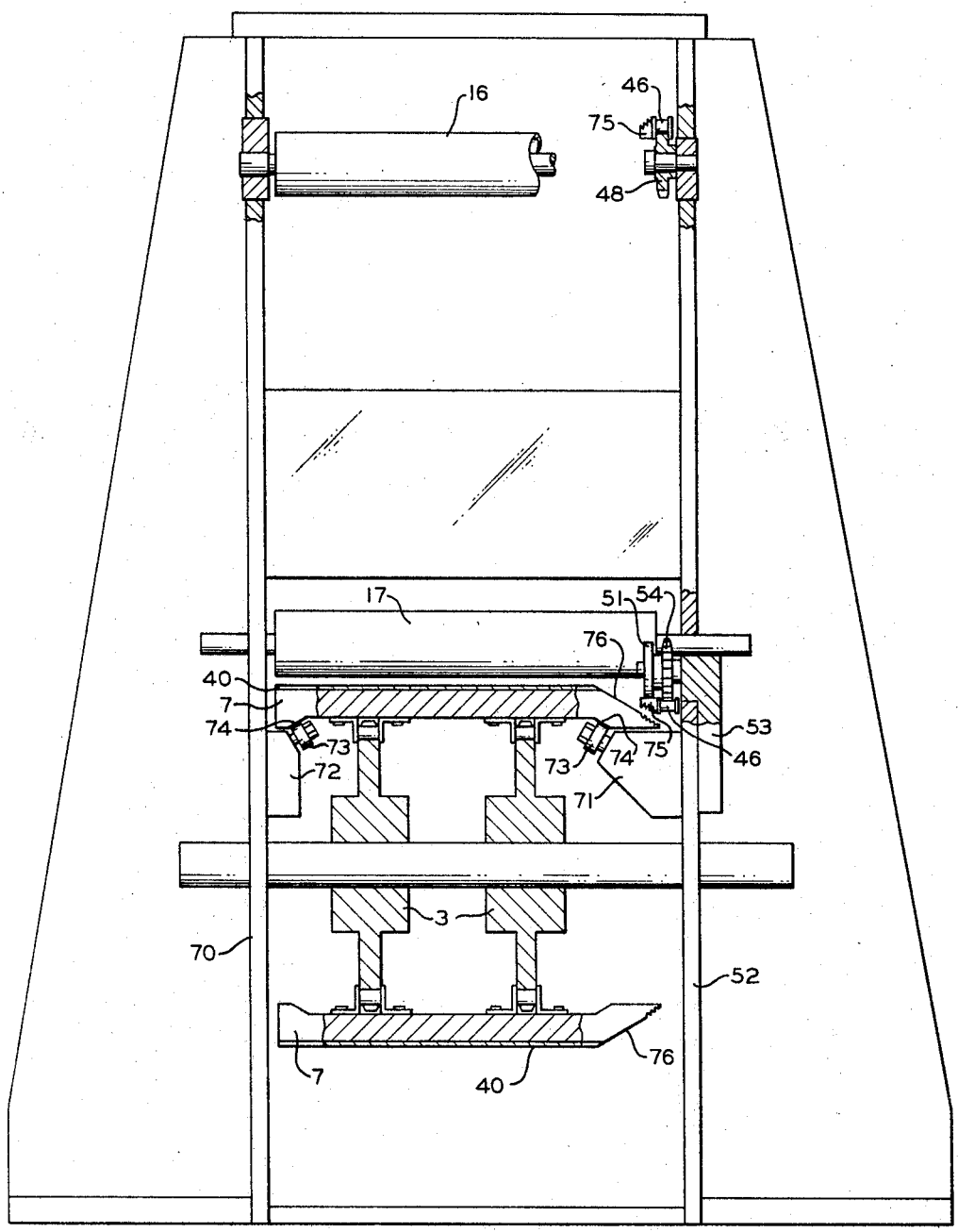
FIGURE 5 is a cross section of a part of the apparatus of FIGURE 3.

A means for holding belt 9 against surfaces 40 of lower plates 7 is shown and includes a chain 46 traversing drive sprocket 47, sprockets 48 and 49, and an unshown sprocket 5 behind sprocket 41. As shown in FIGURE 5, chain 46 carries an inwardly extending pressure member which bears against the inner surface of belt 9 when that belt is in contact with the surfaces 40 of plates 7. Rotating pressure members 51 are fixed to side plate 52 through arms 53 and are adapted to bear against the pressure arm carried by chain 46 thereby binding belt 7 between the pressure arm and a plate 7. Pressure members 51 are rotated by sprockets 54 which engage and are rotated by the movement of chain 46. Chain 46 and belt 9 are both driven by belt 55 so that the chain and the belt move at substantially the same speed. It should be noted that in order to effect substantial identity of speeds of the chain and the belt, the ratios of the diameters of pulleys 56 and 57 to sprocket 47 and roller 17, respectively, must be substantially the same. Gear and/or drive box 58 can be operatively connected to the same driving means that runs the other parts of the machine, as shown with gear box 24 in FIGURE 1, so that the speeds of the upper and lower chains of plates, belt 9 and chain 46 are all coordinated relative to one another to produce the results of the invention.

FIGURE 4, taken along line 4—4 of FIGURE 3, shows side plates 44 between which is fixed a support member 60 which straddles chain 43 and which, through angled rollers 61 and 62, contacts shoulders 63 and 64 of plate 7. The angled nature of rollers 61 and 62 provides both the vertical force for pressing rollers 18 against belt 9 and for preventing plate 7 from moving laterally relative to support member 60.

FIGURE 5, taken along line 5—5 of FIGURE 3, shows sprockets 3 engaging plates 7 through parallel chains attached to plates 7. Side plates 52 and 70 fixedly support members 71 and 72, respectively, each of which rotatably carry a roller 73. Rollers 73 engage shoulders 74 of plates 7 thereby applying both vertical forces and laterally opposing forces to plates 7. Thus, plates 7 are forced upward towards the upper chain of plates and prevented from laterally moving from their direction of movement.

Pressure arm 75 carried on the interior side of chain 46 is disposed above shoulder 76 of plate 7 so that it will press belt 9 (not shown) into contact with shoulder 76 thereby holding belt 9 in a fixed relation to and against plates 7. Rotating pressure member 51 driven by chain 46 through sprocket 54 ensures positive pressing of arm 75 against both belt 9 and shoulder 76. Although arm 75 and shoulder 76 are shown to have teeth in the area in which belt 9 is gripped, it should be noted that other or no auxiliary gripping means can be employed.

*Example*

An apparatus similar to that shown in FIGURE 1 was employed in which belts 9, 9 were endless rubber belts and chains 1, 1 were made up of a series of pivotally connected plates each plate having mounted therein twelve cylindrical rollers 1¾₆ inches long and 1¼₆ inches in diameter. The rollers were arranged in a series similar to that shown in plate 33 of FIGURE 2 and each plate of both chains had a similar arrangement of similar rollers. The rollers were laterally spaced from one another a distance of 1.142 inches. Chains 1, 1 were oriented with respect to belts 9, 9 so that they crossed those belts at an angle theta of 35°. The velocity $V_B$ of the belts 9, 9 was 150 feet per minute and the velocity $V_R$ of the chains was 183.2 feet per minute.

Polyethylene film was uniaxially oriented parallel to its longitudinal axis by stretching of same, having a density of 0.96 and a thickness of 3 mils. The film removed from between belts 9, 9 after passing between chains 1, 1 was fibrillated in that it was a weblike network of coherent fibers randomly drawn to one another along a longitudinal length thereby forming a nonwoven fabric having good strength properties combined with a significant amount of porosity and flexibility.

Reasonable variations and modifications are possible within the scope of this disclosure without departing from the spirit and scope thereof.

We claim:

1. A method for producing fibrillated film comprising disposing a continuous oriented film between at least two sections of elastic material, moving said sections in substantially the same direction as the orientation direction of said film, moving at least one pressure means across the path of movement of said sections in pressing engagement against same to distend same in a direction perpendicular to the direction of movement, the path of movement of said pressure means having components across said sections and parallel to the direction of movement of said sections, coordinating the direction of movement and velocity of said pressure means with the direction of movement and velocity of said sections in a manner such that the component of the velocity of said pressure means that is parallel to the direction of movement of said sections is substantially equal to the velocity of said sections, and recovering from between said sections a fibrillated film.

2. A method for the continuous, high-speed production of fibrillated film comprising disposing a continuous oriented film between at least two sections of elastic material, moving said sections in substantially the same direction as the orientation direction of said film, continuously moving at least one pressure means in a direction which crosses the path of movement of said sections in a manner such that the primary directions of movement of said sections and said pressure means form an angle of less than 90°, coordinating the velocity of said pressure means with the velocity of said sections in a manner such that the component of the velocity of said pressure means that is parallel to the direction of movement of said sections is substantially equal to the velocity of said sections, pressing said pressure means against said sections to distend same at substantially right angles to the direction of movement of said sections, and recovering from between said sections a fibrillated film.

3. A method according to claim 2 wherein said at least two sections of elastic material are comprised of a pair of opposing elastic belts.

4. A method according to claim 2 wherein said at least two sections of elastic material are comprised of an endless elastic belt and an endless chain of plates each plate carrying a section of elastic material between the plate and the opposing endless elastic belt.

5. A method for continuous, high-speed production of fibrillated film comprising disposing a continuous, longitudinally oriented film between two elastic surfaces in a manner such that the direction of orientation of said film is parallel to the longitudinal axis of said surfaces, continuously moving said surfaces at a first primary velocity, continuously moving two endless chains of pressure means which rotate in a direction perpendicular to the direction of movement of said surfaces in a single direction which crosses the path of movement of said surfaces and on either side of said surfaces in a manner such that the main directions of movement of said surfaces and said pressure means forms an angle of less than 90°, coordinating the velocity of said pressure means with the velocity of said surfaces in a manner such that the component of the velocity of said pressure means that is parallel to the direction of movement of said surfaces is substantially equal to the velocity of said surfaces, pressing said pressure means against said surfaces to distend same at substantially right angles to the direction of movement of said surfaces, and recovering from between said surfaces a fibrillated film.

6. A method for continuous, high-speed production of fibrillated film comprising disposing a continuous, longitudinally oriented film between two endless elastic belts in a manner such that the longitudinal axis of said film is parallel to the longitudinal axis of said belts, continuously moving said belts with said film therebetween, continuously moving two endless chains of plates at least one chain of which has a plurality of rolling means in its plates which rolling means rotate in a direction perpendicular to the direction of movement of said belts in a direction which crosses the path of movement of said belts in a manner such that the main directions of movement of said belts and said chains forms an angle of less than 90°, each of said chains passing on either side of said belts while crossing the path of movement of said belts, coordinating the velocity of said chains with the velocity of said belts in a manner such that the component of the velocity of said chains that is parallel to the direction of movement of said belts is substantially equal to the velocity of said belts, pressing said rolling means in said chains against said belts to distend same at substantially right angles to the direction of movement of said belts, and recovering from between said belts a fibrillated film.

References Cited

UNITED STATES PATENTS 3,003,304 10/1961 Rasmussen _____ 264—140 X
3,235,644 2/1966 Rasmussen _____ 264—288

FOREIGN PATENTS 810,001 3/1959 Great Britain.

ROBERT F. WHITE, *Primary Examiner.*

S. I. LANDSMAN, *Assistant Examiner.*

U.S. Cl. X.R.

225—93; 264—147; 28—1

Disclaimer and Dedication 3,424,358.—*Leroy E. Robinson*, and *Dan E. Perry*, Bartlesville, Okla. METHOD FOR PRODUCING FIBRILLATED FILM. Patent dated Jan. 28, 1969. Disclaimer and dedication filed Dec. 28, 1971, by the assignee, *Phillips Petroleum Company*.

Hereby disclaims said patent and dedicates to the Public the remaining term of said patent.

[*Official Gazette April 11, 1972.*]